United States Patent
Fukudome et al.

(10) Patent No.: US 6,682,821 B2
(45) Date of Patent: Jan. 27, 2004

(54) CORROSION-RESISTANT CERAMICS

(75) Inventors: Takero Fukudome, Kokubu (JP); Sazo Tsurudono, Kokubu (JP); Tohru Hisamatsu, Yokosuka (JP); Isao Yuri, Yokosuka (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/330,023

(22) Filed: Dec. 26, 2002

(65) Prior Publication Data

US 2003/0138641 A1 Jul. 24, 2003

(30) Foreign Application Priority Data

Dec. 28, 2001 (JP) .......................... 2001-399097
Nov. 28, 2002 (JP) .......................... 2002-344793

(51) Int. Cl.$^7$ .............................. B32B 18/00; B32B 9/04
(52) U.S. Cl. ................ 428/446; 428/312.2; 428/312.6; 428/697; 428/699; 428/701; 428/702
(58) Field of Search ................ 428/446, 448, 428/689, 697, 698, 699, 701, 702, 304.4, 312.2, 312.6; 416/241 R, 241 B

(56) References Cited

U.S. PATENT DOCUMENTS

| | | | | |
|---|---|---|---|---|
| 4,500,602 A | * | 2/1985 | Patten et al. ............ | 428/408 |
| 4,806,510 A | * | 2/1989 | Kanai et al. ............ | 501/97.2 |
| 5,350,599 A | * | 9/1994 | Rigney et al. ............ | 427/255.7 |
| 5,512,382 A | * | 4/1996 | Strangman ................ | 428/632 |
| 5,523,267 A | * | 6/1996 | Tanaka et al. ............ | 501/92 |
| 5,560,993 A | * | 10/1996 | Morimoto et al. .......... | 428/408 |
| 6,299,988 B1 | * | 10/2001 | Wang et al. .............. | 428/632 |
| 6,485,848 B1 | * | 11/2002 | Wang et al. .............. | 428/697 |
| 6,517,960 B1 | * | 2/2003 | Wang .................... | 428/701 |
| 2002/0025454 A1 | * | 2/2002 | Wang et al. .............. | 428/698 |
| 2003/0003328 A1 | * | 1/2003 | Spitsberg et al. ......... | 428/698 |

FOREIGN PATENT DOCUMENTS

| JP | 01133981 A | * | 5/1989 |
|---|---|---|---|
| JP | 07172958 A | * | 7/1995 |
| JP | 08034685 A | * | 2/1996 |

* cited by examiner

*Primary Examiner*—Deborah Jones
*Assistant Examiner*—Stephen Stein
(74) *Attorney, Agent, or Firm*—Hogan & Hartson

(57) ABSTRACT

Anti-corrosion ceramics comprising a substrate of at least one kind of silicon-containing ceramics selected from a silicon nitride, a silicon carbide and Sialon, and a surface protection layer formed on the surface of the substrate, wherein the surface protection layer comprises a zirconium oxide stabilized with an element of the Group IIIa of periodic table, and the total amount of Al and Si in the surface protection layer is suppressed to be not larger than 1% by mass. Particularly, the surface layer has a thickness of from 5 to 200 μm and a porosity of 5 to 30%. The anti-corrosion ceramics exhibits a high resistance against the corrosion due to the water vapor of high temperatures in a region of not lower than 1000° C., and can be preferably used as parts of internal combustion engines such as parts of gas turbine engines, like a turbine rotor, nozzles, a combustor liner and a transition duct.

10 Claims, 1 Drawing Sheet

CORROSION-RESISTANT CERAMICS

BACKGROUND OF THE INVENTION

1. Field of the Invention

The present invention relates to anti-corrosion ceramics that can be favorably used as a member for high-temperature use and, particularly, as parts for heat engines, such as parts for gas turbine engines.

2. Description of the Related Art

On account of their excellent heat resistance, resistance against heat and shock, abrasion resistance and resistance against oxidation, efforts have been made to utilize silicon nitride, silicon carbide and Sialon which are known engineering ceramics as parts for the heat engines and, particularly, as parts of gas turbines and turbo rotors.

Such non-oxide ceramics containing silicon, to which are added a sintering assistant, are usually highly dense and are highly strong. In the case of silicon nitride ceramics, for example, there can be obtained a sintered body of silicon nitride by adding $Y_2O_3$, $Al_2O_3$ or MgO as a sintering assistant to a powder of silicon nitride followed by firing.

The above ceramics can be used in a temperature region which is as high as 1000° C. or higher where the metal materials could not be used, and realizes a heat efficiency of, for example, not lower than 40% which could not be accomplished with the conventional metal materials.

When these ceramics are to be used as members for internal combustion engines and, particularly, for gas turbines, there are required not only the strength but also other properties under severe conditions of high temperatures. In the combustion engines such as gas turbine engines, the ceramics must exhibit a strong resistance against corrosion due to air streams of high temperatures and must further exhibit abrasion resistance and shock resistance against the collision by very fine particles.

The above-mentioned ceramics containing silicon exhibits excellent resistance against the corrosion due to the water vapor contained in the fuel gas and excellent abrasion resistance, but reacts with the water vapor of high temperatures contained in combustion gas from the gas turbine. Due to the corrosion caused by the water vapor of high temperatures, therefore, the ceramics are worn out vigorously arousing a problem of short life. In particular, such parts as a combustor liner, a transition duct and a stator blade used for the gas turbines are exposed to the combustion gas of high temperatures containing water vapor, and the ceramics on the surfaces are worn out conspicuously.

In order to solve the above problems, therefore, a variety of attempts have been made concerning the sintering assistant, grain boundary phase, firing conditions and forming protection film against oxidation. In order to improve resistance against the water vapor of high temperatures, for example, Japanese Unexamined Patent Publication (Kokai) No. 183676/1997 proposes coating the surfaces of a sintered body comprising chiefly silicon nitride or Sialon with a glass layer comprising chiefly $SiO_2$.

Attempts have also been made to improve resistance against the oxidation, resistance against the erosion and resistance against the corrosion by forming a protection film of alumina or mullite having good resistance against the oxidation on the sintered body of silicon nitride by such a method as CVD or a melt injection.

According to the method of forming a glass layer on the surface as taught by Japanese Unexamined Patent Publication (Kokai) No. 183676/1997, however, the properties can be improved under static conditions where there is no air stream. When really exposed to the gas of high temperatures, high pressures and high speeds in the engine, however, the glass layer on the surface is rapidly worn out since the glass evaporates. Namely, the glass layer has a short life and fails to serve as a protection film.

Alumina and mullite exhibit higher resistance against the corrosion than the silicon nitride. In an atmosphere having a high water vapor partial pressure, however, the alumina and mullite exhibit small resistance against the corrosion and small durability, and are not satisfactory from the practical point of view.

SUMMARY OF THE INVENTION

It is therefore an object of the present invention to provide anti-corrosion ceramics having a high resistance against the corrosion caused by the water vapor of high temperatures and offering a long life in a high-temperature region of not lower than 1000° C.

The present invention was accomplished based on a discovery that the resistance against the water vapor of high temperatures can be improved if a stabilized zirconia layer is formed on the surface of the silicon-containing ceramics and if its composition is controlled. The invention realizes ceramics that can be favorably used, particularly, as parts for constituting internal combustion engines such as gas turbine engines that operate at high temperatures.

According to the present invention, there is provided anti-corrosion ceramics comprising a substrate of at least one kind of silicon-containing ceramics selected from a silicon nitride, a silicon carbide and Sialon, and a surface protection layer formed on the surface of the substrate, wherein the surface protection layer comprises a zirconium oxide stabilized with an element of the Group IIIa of periodic table, and the total amount of Al and Si in the surface protection layer is suppressed to be not larger than 1% by mass.

In the surface layer of a zirconium oxide (hereinafter often referred to simply as stabilized zirconia) stabilized with an element of the Group IIIa of periodic table, the contents of Al and Si, that are subject to be vigorously worn out due to the reaction with the water vapor of high temperatures, have been suppressed to be small without exceeding a predetermined amount. As a result, the surface protection layer is strong against the corrosion due to the water vapor of high temperatures, and is capable of protecting the surfaces of the ceramics containing silicon. Accordingly, the anti-corrosion ceramics of the present invention is very suited for such applications, particularly, as parts for gas turbine engines.

In order to effectively prevent the surface layer from peeling due a difference in the thermal expansion from the substrate of silicon-containing ceramics, it is desired that the surface protection layer has a thickness of from 5 to 200 µm.

It is further desired that the element of the Group IIIa of periodic table used for stabilizing the zirconium oxide is at least one selected from Y, Er, Yb and Lu. This is because when the zirconium oxide is stabilized with the element having a small ionic radius of the Group IIIa of periodic table as described above, the coefficient of thermal expansion becomes relatively small, making it possible to effectively prevent the surface protection layer from peeling due to the difference in the thermal expansion. It is desired that the element of the Group IIIa of periodic table is existing in the surface protection layer in an amount of from 3 to 15% by mol calculated as an oxide thereof. The surface protection layer formed of the zirconium oxide stabilized with the element of the Group IIIa of periodic table is peeled or worn out little even when it is exposed to the gas of a high temperature, a high pressure and a high speed, exhibiting markedly improved resistance against the oxidation, resistance against the erosion and resistance against the corrosion.

It is desired that the surface protection layer has a porosity of from 1 to 30% and, particularly, from 5 to 30%. This relaxes the stress due to a difference in the thermal expansion between the substrate and the surface protection layer, and suppresses the surface layer from peeling.

It is further desired that the surface protection layer has a texture extending like columns toward the surface from the interface to the substrate. This is because, even when the surface protection layer is cracked due to the thermal stress, cracks develop in the columnar interface and, hence, the surface protection layer does not peel off the substrate but stays adhered to the substrate.

In the present invention, an intermediate layer comprising $RE_2Si_2O_7$ and/or $RE_2SiO_5$ (RE: element of the Group IIIa of periodic table) can be provided between the substrate and the surface protection layer. Provision of the intermediate layer works to relax the stress caused by the difference in the thermal expansion between the substrate and the surface protection layer, and to suppress the surface layer from peeling.

The intermediate layers may be formed in a plurality of numbers. In this case, it is desired that the intermediate layers are formed of disilicate crystals ($RE_2Si_2O_7$) of different elements (RE) of the Group IIIa of periodic table, the intermediate layers being so arranged that the coefficients of thermal expansion of the intermediate layers gradually increase from the substrate toward the surface protection layer (which has a coefficient of thermal expansion larger than that of the substrate). That is, upon arranging the intermediate layers in a manner that the coefficients of thermal expansion thereof are inclined, it is allowed to effectively relax the thermal stress due to the difference in the thermal expansion between the surface protection layer and the ceramic substrate, whereby the surface protection layer is effectively prevented from peeling. As a result, the anti-corrosion ceramics of the present invention permit the layers to stably exhibit their properties, and offers improved resistance against the water vapor of high temperatures, lending itself well for use, particularly, as parts for constituting internal combustion engines such as gas turbine engines that operate at high temperatures.

DETAILED DESCRIPTION OF THE INVENTION

Figure 1:
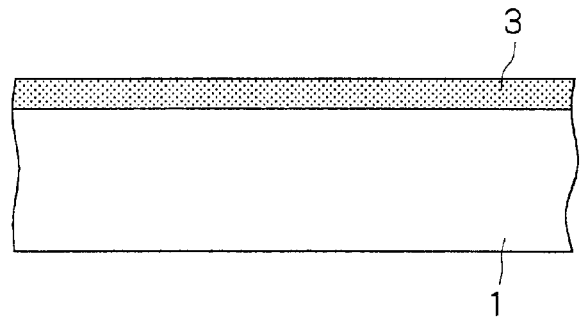
FIG. 1 is a sectional view illustrating a constitution of a layer of anti-corrosion ceramics of the present invention.

Referring to FIG. 1 illustrating a constitution of a layer of anti-corrosion ceramics of the present invention, the anti-corrosion ceramics comprises a ceramic substrate 1 and a surface protection layer 3.

Substrate 1

The ceramic substrate 1 is made of silicon-containing ceramics selected from at least one of a silicon nitride, a silicon carbide or Sialon.

Any of these silicon-containing ceramics exhibits excellent properties such as mechanical strength but exhibits poor resistance against the corrosion in a high-temperature combustion gas atmosphere. Therefore, their surfaces are covered with a surface protection layer 3 or an intermediate layer 2 that will be described later to effectively improve their resistance against corrosion, so that they exhibit extended life when used as high-temperature structural parts. In particular, the sintered body of a silicon nitride exhibits a large strength from room temperature through up to high temperatures and is most advantageous for realizing anti-corrosion ceramics suited as members for gas turbines.

Here, the substrate 1 may contain other components stemming from a sintering assistant and the like so far as they do not impair the above-mentioned properties of silicon-containing ceramics, and may contain, for example, oxides of rare earth elements and silicon dioxide in amounts of not larger than 25% by mol.

Surface Protection Layer 3

It is important that the surface protection layer formed on the surface of the substrate comprises zirconia stabilized with an element of the Group IIIa of periodic table. Namely, the zirconium oxide undergoes the phase transformation accompanying a change in the temperature, whereby the volume changes giving rise to the occurrence of cracks. By being stabilized with an element of the Group IIIa of periodic table, however, the occurrence of cracks can be prevented.

Elements of the Group IIIa of periodic table used for stabilizing the zirconium oxide include Sc, Y, La, Ce, Pr, Nd, Pm, Sm, Eu, Gd, Tb, Dy, Ho, Er, Tm, Yb and Lu. Among them, though there is no particular limitation, it is particularly desired to use at least one of Er, Yb or Lu. These elements have small ionic radii. When stabilized with these elements, therefore, the coefficient of thermal expansion becomes relatively small, and the surface protection layer 3 is effectively suppressed from peeling. From the standpoint of cost, Y is preferred.

The content of the element of the Group IIIa of periodic table in the surface protection layer 3 may be within a range in which it stabilizes the zirconium oxide without seriously affecting the resistance against the corrosion due to the water vapor and may, particularly, be from 3 to 15% by mol and, more particularly, from 5 to 12% by mol calculated as an oxide thereof.

According to the present invention, further, it is important that the total amount of Al and Si contained in the surface protection layer 3 has been suppressed to be not larger than 1% by mass, particularly, not larger than 0.1% by mass and, more particularly, not larger than 0.01% by mass. When the total amount of Al and Si exceeds 1% by mass, corrosion takes place to a large extent in the water vapor of high temperatures. To form the surface protection layer in the present invention, therefore, it is necessary to suppress the contents of Al and Si to lie in the above-mentioned range by using the zirconium oxide of a high purity and an oxide of an element of the Group IIIa of periodic table.

The surface protection layer formed of the above stabilized zirconia exhibits very high stability in an oxidizing atmosphere containing the water vapor of high temperatures as compared to the conventional protection films composed of $SiO_2$, $Al_2O_3$, mullite, cordierite or YAG, and exhibits excellent resistance against the oxidation and corrosion. On account of its high melting point, further, the surface protection layer formed of the stabilized zirconia features excellent heat resistance and long life at high temperatures.

It is desired that the above surface protection layer 3 has a thickness of from 5 to 200 μm, particularly, from 10 to 150 μm and, more particularly, from 30 to 100 μm. This is to decrease the difference in the thermal expansion thereby to prevent the protection layer from peeling and to extend the life of the anti-corrosion ceramics.

It is further desired that the surface protection layer 3 has a porosity of from 1 to 30%, preferably, from 5 to 30% and, most preferably, from 7 to 15%. This is to effectively suppress the cracks from occurring and growing despite fine particles impinge upon the surface protection layer 3 and to suppress the surface protection layer from being cut or peeled.

It is further desired that the surface protection layer 3 comprises columnar crystals, the long axes of the columnar crystals being nearly perpendicular to the surface of the substrate 1. This is because, even when the surface protection layer 3 is cracked due to thermal stress, cracks are confined in the columnar interfaces, and the surface protection layer 3 stays adhered to the substrate 1 without peeling off the substrate 1.

Intermediate Layer

Figure 2:
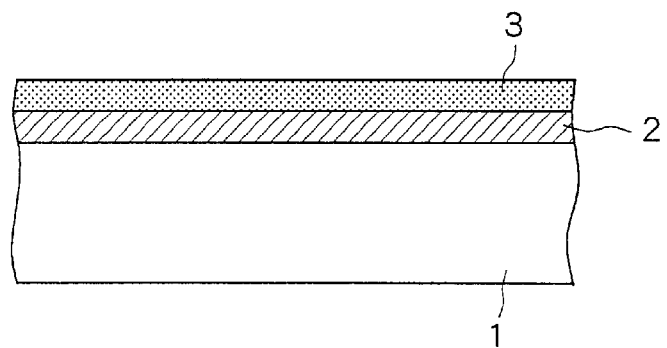
FIG. 2 is a sectional view illustrating a constitution of layers of anti-corrosion ceramics of the present invention having an intermediate layer.

In the present invention, further, it is desired to provide an intermediate layer 2 between the above-mentioned ceramic substrate 1 and the surface protection layer 3 as shown in FIG. 2. The intermediate layer 2 comprises a composite oxide represented by $RE_2Si_2O_7$ and/or $RE_2SiO_5$ (RE: element of the Group IIIa of periodic table), and preferably has a thickness of from 5 to 200 μm, particularly, from 10 to 150 μm and, most preferably, from 30 to 100 μm from the standpoint of relaxing the thermal stress, reliability and extended life.

The above composite oxide has a coefficient of thermal expansion that lies between the coefficient of thermal expansion of the silicon nitride, silicon carbide or Sialon forming the substrate 1 and the coefficient of thermal expansion (larger than that of the substrate 1) of the stabilized zirconia forming the surface protection layer 3. Therefore, the intermediate layer 2 formed of the composite oxide works to relax the stress due to the difference in the thermal expansion and to effectively suppress the surface protection layer 3 from peeling. Besides, the composite oxide exhibits a large resistance against the corrosion due to the water vapor of high temperatures, exhibits a high melting point, decreases the effect upon the substrate 1 even when pinholes and cracks are existing in the surface protection layer 3, and effectively serves as an intermediate layer.

As the element of the Group IIIa of periodic table in the composite oxide, there can be preferably used at least one of Y, Er, Yb and Lu. In particular, it is desired to use the same element as the one used for stabilizing the zirconium oxide that is forming the surface protection layer.

Figure 3:
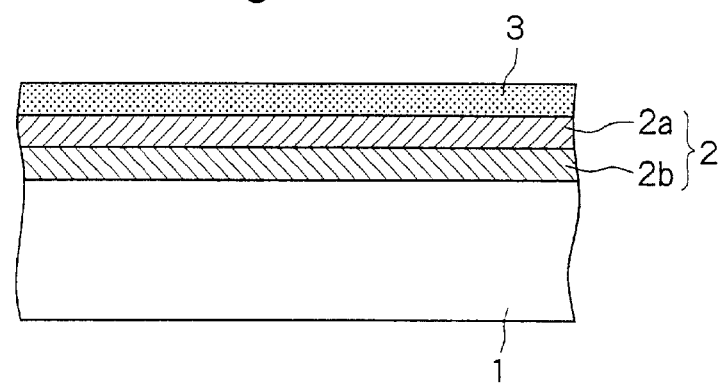
FIG. 3 is a sectional view illustrating a preferred constitution of layers of anti-corrosion ceramics of the present invention having intermediate layers.

In the present invention, further, the intermediate layers 2 can be formed in a plurality of numbers as shown in FIG. 3. In the example of FIG. 3, there are formed two intermediate layers 2a and 2b.

When formed in a plurality of numbers, it is desired that the intermediate layers 2a and 2b are formed of disilicate crystals ($RE_2Si_2O_7$) of different elements (RE) of the Group IIIa of periodic table, the coefficients of thermal expansion of the layers gradually increasing from the ceramic substrate 1 toward the surface protection layer 3. That is, in the example of FIG. 3, the coefficients of thermal expansion are gradually increasing in order of ceramic substrate 1, intermediate layer 2a, intermediate layer 2b and surface protection layer 3.

Since the coefficients of thermal expansion are inclining as described above, the thermal stress due to the difference in the thermal expansion between the ceramic substrate 1 and the surface protection layer 3 is effectively relaxed by the intermediate layers 2a and 2b, the surface protection layer 3 is effectively prevented from peeling, and the life can be extended under high-temperature conditions.

Though the intermediate layers 2 were formed in a number of two (2a, 2b) in the example of FIG. 3, it is allowable, as a matter of course, to form the intermediate layers 2 in a number of three or more so far as they are arranged in a manner that the coefficients of thermal expansion are inclined.

In the present invention, there is no particular limitation on the kinds of disilicates (kinds of elements RE of the Group IIIa of periodic table) forming the intermediate layers 2a, 2b so far as they are arranged in a manner that the coefficients of thermal expansion are inclined. In general, however, it is desired that at least one of the intermediate layers 2a and 2b is formed of $Er_2Si_2O_7$, $Yb_2Si_2O_7$ or $Lu_2Si_2O_7$ from the standpoint of resistance against the water vapor of high temperatures.

In the present invention, it is desired that the intermediate layers 2 (intermediate layers 2a, 2b) have a porosity of not larger than 5% and, particularly, not larger than 3%. This is because, even when there are pinholes and cracks in the surface protection layer 3, their effect upon the ceramic substrate 1 can be decreased.

The anti-corrosion ceramics of the present invention having the layer constitutions shown in FIGS. 1 to 3 exhibit particularly excellent resistance against the oxidation and corrosion due to the water vapor, and can be favorably used as parts for internal combustion engines, such as gas turbine engine parts like a turbine rotor, nozzles, combustor liners, transition ducts and the like.

Production of Anti-corrosion Ceramics

To produce anti-corrosion ceramics of the present invention, first, there is prepared a substrate of at least one kind of silicon-containing ceramics such as silicon nitride, silicon carbide or Sialon. It is desired that the substrate 1 is a sintered body from the standpoint of cost. As described earlier, further, there may be contained a sintering assistant. For example, there may be used a sintered body of silicon nitride containing an oxide of a rare earth element in an amount of from 0.5 to 10 mol % and a silicon dioxide in an amount of from 1 to 20 mol %.

As desired, the above-mentioned intermediate layer 2 is formed on the surface of the substrate 1.

For example, a powder of a composite oxide expressed by $RE_2Si_2O_7$ and/or $RE_2SiO_5$ is dispersed in a predetermined solvent or a dispersant to prepare a slurry thereof, which is, then, applied onto the surface of the substrate 1 followed by the heat-treatment at a temperature as high as 1400° C. or more to form the intermediate layer 2. Further, the slurry may be the one prepared by using a mixed powder of an $RE_2O_3$ powder and an $SiO_2$ powder mixed at a predetermined ratio. Or, when the intermediate layers 2 are formed in a plurality of numbers, the slurries for forming the intermediate layers may be applied onto the substrate 1 successively and may, then, be treated with heat.

The slurry can be applied by a spray method which sprays the slurry, by a dipping method which immerses the substrate in the slurry or by the like method. It is desired that the slurry has a viscosity of from 0.5 to 3.0 Pa·s so that it can be uniformly applied onto the surface of the substrate 1.

The intermediate layer 2 can be formed at a low cost and intimately relying upon the above application method of applying the slurry onto the surface of the ceramic substrate 1 followed by the heat treatment. The intermediate layer 2 can be further formed by such an existing film-forming technology as plasma melt-injection method, CVD method or PVD method.

As described above, the intermediate layer 2 is formed as required and, then, the surface protection layer 3 of stabilized zirconia is formed.

A powder of a highly pure (99.9% or higher) zirconium oxide and a powder of an oxide ($RE_2O_3$) of an element of the Group IIIa of periodic table are used as staring materials for forming the surface protection layer 3. It is further possible to directly use a zirconia powder stabilized with an oxide of an element of the Group IIIa of periodic table. In either case, it is important that the starting powders have such high purities as to contain Al and Si in amounts lying within the above-mentioned ranges (in a total amount of not larger than 1% by mass).

These starting powders are mixed together by adding a solvent or a dispersant thereto to prepare a slurry thereof, which is, then, applied onto the surface of the substrate 1 or onto the intermediate layer 2, followed by drying to form a coated layer. The slurry can be applied by a spray method which sprays the slurry, by a dipping method which immerses the substrate in the slurry or by the like method so as to be uniformly applied onto the surface of the substrate. It is desired that the slurry has a viscosity of from 0.5 to 3.0 Pa·s so that it can be uniformly applied.

The substrate 1 having the layers thus formed is heat-treated to form the surface protection layer 3 as desired. The heat treatment is conducted at a temperature of, desirably, from 1300° C. to 1900° C., particularly, from 1400 to 1600° C. and, more particularly, from 1450 to 1550° C., so that the surface protection layer 3 is formed very densely.

The surface protection layer 3 can be formed at a low cost and intimately by applying the slurry onto the surface of the ceramic substrate followed by the heat treatment as described above. The surface protection layer can be further formed by such an existing film-forming technology as plasma melt-injection method, CVD method or PVD method. In order to form columnar crystals, further, it is desired to use a CVD method and a PVD method and, particularly, an EB-PVD (electron beam physical vapor deposition) method.

To control the porosity so as to lie within a predetermined range (1 to 30%), the temperature for the heat treatment may be controlled. When, for example, a stabilized zirconia powder containing $Y_2O_3$ in an amount of 8% by mass is applied, the temperature for the heat treatment may be adjusted to lie in a range of from 1300 to 1600° C. Further, the porosity can be adjusted even by changing the content of the stabilizer or the time for conducting the heat treatment.

Through the above-mentioned method of production, there is obtained the anti-corrosion ceramics of the present invention having a surface protection layer 3 which contains Al and Si in small amounts, which is formed of a zirconium oxide stabilized with an element of the Group IIIa of periodic table, and which has a porosity of from 1 to 30% (preferably, from 5 to 30%) and a thickness of from 5 to 200 μm. It is further possible to form the surface protection layer 3 of columnar crystals with their long axes being nearly perpendicular to the surface of the substrate.

EXAMPLES

Experiment 1

There were prepared substrates of sintered bodies comprising silicon nitride, silicon carbide and Sialon as chief components.

The sintered body of silicon nitride was fired while adding, as sintering assistants, 3% by mol of ruthenium oxide and 6% by mol of silicon dioxide thereto.

The sintered body of silicon carbide was fired while adding, as sintering assistants, 0.4% by mass of $B_4C$ and 1.9% by mass of C thereto.

The Sialon was fired while adding, as sintering assistants, 5% by mol of yttrium oxide and 4% by mol of silicon dioxide thereto.

The substrates were machined into a size of 4 mm deep, 40 mm wide and 3 mm high.

The intermediate layer was formed on the surfaces of the substrates of the samples Nos. 19 to 21. That is, a slurry of a disilicate powder and a monosilicate powder was applied by being sprayed using a spray gun onto the surfaces of the substrates. After drying, the heat treatment was conducted at a temperature of 1750° C. for 10 minutes to form the intermediate layer.

A $ZrO_2$ powder of a purity of 99.9%, and a $Y_2O_3$ powder, an $Lu_2O_3$ powder, a $Yb_2O_3$ powder, an $Er_2O_3$ powder, an $Sm_2O_3$ powder and an $Sc_2O_3$ powder having a purity of 99.9%, were weighed to obtain compositions shown in Table 1, and to which were added water and a binder (PVA). The mixtures were stirred in a rotary mill using zirconium balls for 24 hours to prepare slurries.

For comparison (samples Nos. 31 to 33), slurries were prepared in the same manner by using an $Al_2O_3$ powder, a mullite (MU) powder and a cordierite (CJ) powder having a purity of 99.9%. The obtained slurries were applied by being sprayed using a spray gun onto the surfaces of the substrates (onto the intermediate layers when the substrates possessed the intermediate layers), and were dried in a drier at 120° C. The obtained samples were heat-treated in the atmosphere under the conditions of Table 1.

As for the sample No. 25, the surface layer of stabilized zirconia was formed by the EB-PVD method. Further, the sintered body of silicon nitride without forming the surface layer was evaluated as comparative example (sample No. 34).

The evaluation was based upon the oxidation testing, shock testing and corrosion testing due to the water vapor.

As for the oxidation testing, the sample was left to stand in the atmosphere at 1200° C. for 100 hours to measure a change (increase) in the weight due to oxidation.

As for the shock testing, the heat cycle testing was conducted 20 cycles under the conditions of 1300° C. to 300° C., and the presence of cracks in the surface protection layer was observed relying upon a fluorescent flaw detect solution osmotic method.

As for the corrosion testing due to the water vapor, the water and sample were introduced into a sealed container, and a change (decrease) in the weight was measured while maintaining the temperature at 200° C. and the pressure of 1.5 MPa for 100 hours.

As for the exposure testing, the sample was placed on an exposure testing device, a methane gas was burned, the combustion gas was blown onto the sample at velocities of flow shown in Table 2 to measure a decrease in the weight and to confirm the presence of cracks in the coated layers.

TABLE 1

| | | | Composition | | | | | Production method | | |
|---|---|---|---|---|---|---|---|---|---|---|
| | | Inter- | Surface layer | | | | | | Heat | |
| | | mediate | | Stabilizer | | Impurit | | Slurry | treatment | |
| Sample No. | Substrate Kind | layer Kind | Kind | Kind | Amount mol % | Al mass % | Si mass % | viscosity (Pa · s) | Temp. (° C.) | Time (h) |
| 1 | $Si_3N_4$ | — | $ZrO_2$ | $Y_2O_3$ | 8 | <0.01 | <0.01 | 1 | 1500 | 1 |
| 2 | $Si_3N_4$ | — | $ZrO_2$ | $Y_2O_3$ | 8 | 0.9 | <0.01 | 1 | 1500 | 1 |
| 3 | $Si_3N_4$ | — | $ZrO_2$ | $Y_2O_3$ | 8 | <0.01 | 0.9 | 1 | 1500 | 1 |
| 4 | $Si_3N_4$ | — | $ZrO_2$ | $Y_2O_3$ | 8 | 0.5 | 0.5 | 1 | 1500 | 1 |
| *5 | $Si_3N_4$ | — | $ZrO_2$ | $Y_2O_3$ | 8 | 1 | 1 | 1 | 1500 | 1 |
| *6 | $Si_3N_4$ | — | $ZrO_2$ | $Y_2O_3$ | 8 | <0.01 | 2 | 1 | 1500 | 1 |
| *7 | $Si_3N_4$ | — | $ZrO_2$ | $Y_2O_3$ | 8 | 2 | <0.01 | 1 | 1500 | 1 |
| 8 | $Si_3N_4$ | — | $ZrO_2$ | $Y_2O_3$ | 8 | <0.01 | <0.01 | 1 | 1500 | 1 |
| 9 | $Si_3N_4$ | — | $ZrO_2$ | $Y_2O_3$ | 8 | <0.01 | <0.01 | 1 | 1500 | 1 |
| 10 | $Si_3N_4$ | — | $ZrO_2$ | $Y_2O_3$ | 8 | <0.01 | <0.01 | 1 | 1500 | 1 |
| 11 | $Si_3N_4$ | — | $ZrO_2$ | $Y_2O_3$ | 8 | <0.01 | <0.01 | 1 | 1500 | 1 |
| 12 | $Si_3N_4$ | — | $ZrO_2$ | $Y_2O_3$ | 8 | <0.01 | <0.01 | 1 | 1500 | 1 |
| 13 | $Si_3N_4$ | — | $ZrO_2$ | $Y_2O_3$ | 8 | <0.01 | <0.01 | 1 | 1500 | 1 |
| 14 | $Si_3N_4$ | — | $ZrO_2$ | $Lu_2O_3$ | 8 | <0.01 | <0.01 | 1 | 1500 | 1 |
| 15 | $Si_3N_4$ | — | $ZrO_2$ | $Yb_2O_3$ | 8 | <0.01 | <0.01 | 1 | 1500 | 2 |
| 16 | $Si_3N_4$ | — | $ZrO_2$ | $Er_2O_3$ | 8 | <0.01 | <0.01 | 1 | 1500 | 2 |
| 17 | $Si_3N_4$ | — | $ZrO_2$ | $Sm_2O_3$ | 8 | <0.01 | <0.01 | 2 | 1500 | 1 |
| 18 | $Si_3N_4$ | — | $ZrO_2$ | $Sc_2O_3$ | 8 | <0.01 | <0.01 | 0.6 | 1500 | 1 |
| 19 | $Si_3N_4$ | D | $ZrO_2$ | $Y_2O_3$ | 8 | <0.01 | <0.01 | 1 | 1500 | 1 |
| 20 | $Si_3N_4$ | D | $ZrO_2$ | $Y_2O_3$ | 8 | <0.01 | <0.01 | 1 | 1500 | 1 |
| 21 | $Si_3N_4$ | D,M | $ZrO_2$ | $Y_2O_3$ | 8 | <0.01 | <0.01 | 1 | 1500 | 1 |
| 22 | $Si_3N_4$ | — | $ZrO_2$ | $Y_2O_3$ | 8 | <0.01 | <0.01 | 1 | 1600 | 1 |
| 23 | $Si_3N_4$ | — | $ZrO_2$ | $Y_2O_3$ | 8 | <0.01 | <0.01 | 3 | 1600 | 1 |
| 24 | $Si_3N_4$ | — | $ZrO_2$ | $Y_2O_3$ | 8 | <0.01 | <0.01 | 1 | 1300 | 5 |
| 25 | $Si_3N_4$ | — | $ZrO_2$ | $Y_2O_3$ | 8 | <0.01 | <0.01 | 1 | — | — |
| 26 | SiC | — | $ZrO_2$ | $Y_2O_3$ | 8 | <0.01 | <0.01 | 1 | 1500 | 1 |
| 27 | SiALON | — | $ZrO_2$ | $Y_2O_3$ | 8 | <0.01 | <0.01 | 1 | 1500 | 1 |
| 28 | $Si_3N_4$ | — | $ZrO_2$ | $Y_2O_3$ | 3 | <0.01 | <0.01 | 1 | 1500 | 1 |
| 29 | $Si_3N_4$ | — | $ZrO_2$ | $Y_2O_3$ | 8 | <0.01 | <0.01 | 1 | 1500 | 1 |
| 30 | $Si_3N_4$ | — | $ZrO_2$ | $Y_2O_3$ | 12 | <0.01 | <0.01 | 1 | 1500 | 1 |
| *31 | $Si_3N_4$ | — | $Al_2O_3$ | — | — | — | — | 1 | 1500 | 1 |
| *32 | $Si_3N_4$ | — | MU | — | — | — | — | 1 | 1500 | 1 |
| *33 | $Si_3N_4$ | — | CJ | — | — | — | — | 1 | 1500 | 1 |
| *34 | $Si_3N_4$ | — | — | — | — | — | — | — | — | 1 |

Samples marked with * lie outside the scope of the invention.
D: $RE_2Si_2O_7$
MU: mullite
M: $RE_2SiO_5$
CJ: cordierite

TABLE 2

| | Surface layer | | | Oxidizing | | Water vapor | | Exposure test | | | |
|---|---|---|---|---|---|---|---|---|---|---|---|
| Sample No. | Thickness (μm) | Porosity (%) | Crystal shape | test change (mg/cm²) | Heat shock test Peel | corrosion change (mg/cm²) | Temp. (° C.) | Flow velocity (m/s) | Vapor pressure (kPa) | Decrease of wt. (mg/cm²) | Cracks |
| 1 | 50 | 10 | equi-axed | <0.005 | no | <0.005 | 1200 | 150 | 30 | <0.005 | no |
| 2 | 50 | 10 | equi-axed | 0.03 | no | <0.005 | 1200 | 150 | 30 | 0.01 | no |
| 3 | 50 | 10 | equi-axed | 0.02 | no | <0.005 | 1200 | 150 | 30 | 0.01 | no |
| 4 | 50 | 10 | equi-axed | 0.05 | no | <0.005 | 1200 | 150 | 30 | 0.01 | no |
| *5 | 50 | 10 | equi-axed | 0.08 | no | 0.3 | 1200 | 150 | 30 | 0.6 | no |
| *6 | 50 | 10 | equi-axed | 0.07 | no | 0.4 | 1200 | 150 | 30 | 0.7 | no |
| *7 | 50 | 10 | equi-axed | 0.12 | no | 0.2 | 1200 | 150 | 30 | 0.5 | no |
| 8 | 5 | 10 | equi-axed | <0.005 | no | <0.005 | 1200 | 150 | 30 | <0.005 | no |
| 9 | 10 | 10 | equi-axed | <0.005 | no | <0.005 | 1200 | 150 | 30 | <0.005 | no |
| 10 | 30 | 10 | equi-axed | <0.005 | no | <0.005 | 1200 | 150 | 30 | <0.005 | no |
| 11 | 100 | 10 | equi-axed | <0.005 | no | <0.005 | 1200 | 150 | 30 | <0.005 | no |
| 12 | 150 | 10 | equi-axed | <0.005 | partly yes | <0.005 | 1200 | 150 | 30 | <0.005 | no |

TABLE 2-continued

| | Surface layer | | | Oxidizing | | Water vapor | | Exposure test | | | |
| Sample No. | Thickness ($\mu$m) | Porosity (%) | Crystal shape | test change (mg/cm$^2$) | Heat shock test Peel | corrosion change (mg/cm$^2$) | Temp. (° C.) | Flow velocity (m/s) | Vapor pressure (kPa) | Decrease of wt. (mg/cm$^2$) | Cracks |
|---|---|---|---|---|---|---|---|---|---|---|---|
| 13 | 200 | 10 | equi-axed | <0.005 | partly yes | <0.005 | 1200 | 150 | 30 | <0.005 | no |
| 14 | 50 | 10 | equi-axed | <0.005 | no | <0.005 | 1200 | 150 | 30 | <0.005 | no |
| 15 | 50 | 10 | equi-axed | <0.005 | no | <0.005 | 1200 | 150 | 30 | <0.005 | no |
| 16 | 50 | 10 | equi-axed | <0.005 | no | <0.005 | 1200 | 150 | 30 | <0.005 | no |
| 17 | 50 | 10 | equi-axed | <0.005 | no | <0.005 | 1200 | 150 | 30 | 0.01 | no |
| 18 | 50 | 10 | equi-axed | <0.005 | no | <0.005 | 1200 | 150 | 30 | 0.01 | no |
| 19 | 200 | 10 | equi-axed | <0.005 | no | <0.005 | 1200 | 150 | 30 | <0.005 | no |
| 20 | 200 | 10 | equi-axed | <0.005 | no | <0.005 | 1200 | 150 | 30 | <0.005 | no |
| 21 | 200 | 10 | equi-axed | <0.005 | no | <0.005 | 1200 | 150 | 30 | <0.005 | no |
| 22 | 50 | 5 | equi-axed | <0.005 | no | <0.005 | 1200 | 150 | 30 | <0.005 | no |
| 23 | 50 | 20 | equi-axed | 0.01 | no | <0.005 | 1200 | 150 | 30 | <0.005 | no |
| 24 | 50 | 30 | equi-axed | 0.02 | no | <0.005 | 1200 | 150 | 30 | <0.005 | no |
| 25 | 200 | 5 | columnar | <0.005 | no | <0.005 | 1200 | 150 | 30 | <0.005 | no |
| 26 | 50 | 10 | equi-axed | <0.005 | no | <0.005 | 1200 | 150 | 30 | <0.005 | no |
| 27 | 50 | 10 | equi-axed | 0.03 | no | <0.005 | 1200 | 150 | 30 | <0.005 | no |
| 28 | 50 | 10 | equi-axed | <0.005 | no | <0.005 | 1200 | 150 | 30 | <0.005 | no |
| 29 | 50 | 10 | equi-axed | <0.005 | no | <0.005 | 1400 | 150 | 40 | 0.01 | no |
| 30 | 50 | 10 | equi-axed | <0.005 | no | <0.005 | 1200 | 150 | 30 | <0.005 | no |
| *31 | 50 | 10 | equi-axed | <0.005 | yes | 0.7 | 1400 | 150 | 40 | 1.0 | yes |
| *32 | 50 | 20 | equi-axed | <0.005 | yes | 0.3 | 1400 | 150 | 40 | 0.5 | no |
| *33 | 50 | 20 | equi-axed | <0.005 | yes | 0.4 | 1400 | 150 | 40 | 0.7 | no |
| *34 | — | — | — | <0.005 | — | 1.5 | 1400 | 150 | 40 | 2.0 | — |

Samples marked with * lie outside the scope of the invention.

First, it will be understood that with the samples Nos. 1 to 4 and 8 to 30 of the present invention, mass losses in the corrosion testing due to the water vapor were not larger than 0.005 mg/cm$^2$, featuring a high resistance against the corrosion in the gaseous atmosphere containing the water vapor. It will be further understood that these samples exhibited excellent resistance against the oxidation and high resistance against the heat and shock. Even in the testing for exposure to combustion gas, the above samples yielded weight losses of not larger than 0.01 mg/cm$^2$, featuring excellent resistance against the corrosion due to the combustion gas.

On the other hand, with the samples Nos. 5 to 7 containing impurities such as Al and Si in the surface protection layer in an amount in excess of 1% by mass which was outside the scope of the invention, mass losses in the exposure testing were not smaller than 0.50 mg/cm$^2$. Besides, the resistances against the oxidation were not smaller than 0.07 mg/cm$^2$. In the corrosion testing due to the water vapor, further, the weight losses were not smaller than 0.2 mg/cm$^2$.

The samples Nos. 31 to 34 without using stabilized $ZrO_2$ in the surface protection layer yielded mass losses in the exposure testing of not smaller than 0.50 mg/cm$^2$, and developed cracks in the heat and shock testing. In the corrosion testing due to the water vapor, further, the weight losses were not smaller than 0.3 mg/cm$^2$.

Experiment 2

There were prepared ceramic substrates of sintered bodies comprising the silicon nitride. The sintered body of the silicon nitride was fired while adding, as sintering assistants, 3% by mol of ruthenium oxide and 6% by mol of silicon dioxide thereto.

The ceramic substrates were machined into a size of 4 mm deep, 40 mm wide and 3 mm high.

The intermediate layer was formed on the surfaces of the ceramic substrates. That is, a slurry of a powder of disilicate of an element of the Group IIIa of periodic table having a coefficient of thermal expansion closest to, but is slightly smaller than, that of the ceramic substrate, was applied by being sprayed using a spray gun onto the surfaces of the ceramic substrates. After drying, the heat treatment was conducted at a temperature of 1650° C. for 10 minutes to form a first intermediate layer.

Next, a slurry of a powder of disilicate of an element of the Group IIIa of periodic table having an intermediate coefficient of thermal expansion larger than that of the first intermediate layer but smaller than that of a surface protection layer that is to be formed, was applied by being sprayed using a spray gun onto the surfaces of the ceramic substrate (surface of the first intermediate layer). After drying, the heat treatment was conducted at a temperature of 1600° C. for 10 minutes to form a second intermediate layer. As desired, further, a third intermediate layer was formed by the same method.

A $ZrO_2$ powder of a purity of 99.9%, and a $Y_2O_3$ powder, an $Lu_2O_3$ powder, a $Yb_2O_3$ powder, an $Er_2O_3$ powder, an $Sm_2O_3$ powder and an $Sc_2O_3$ powder having a purity of 99.9%, were weighed to obtain compositions shown in Table 1, and to which were added water and a binder (PVA). The mixtures were stirred in a rotary mill using zirconium balls for 24 hours to prepare slurries.

For comparison (samples Nos. 16 to 18), slurries were prepared in the same manner by using an $Al_2O_3$ powder, a mullite (MU) powder and a cordierite (CJ) powder having a purity of 99.9%.

The obtained slurries were applied by being sprayed using a spray gun onto the surfaces of the ceramic substrates, and were dried in a drier at 120° C. The obtained samples were heat-treated in the atmosphere under the conditions of Table 1 to form the surface protection layer.

As for the sample No. 12, the surface protection layer of stabilized zirconia was formed by the EB-PVD method.

For comparison, further, the sample No. 19 was evaluated by forming neither the anti-corrosion ceramic layer nor the surface protection layer on the ceramic substrate of sintered body of silicon nitride.

The evaluation was based upon the heat and shock testing and the exposure testing.

As for the heat and shock testing, the heat cycle testing was conducted 100 cycles under the conditions of 1300° C. to 300° C., and the presence of cracks in the surface protection layer was observed relying upon a fluorescent flaw detect solution osmotic method.

As for the exposure testing, the sample was placed on an exposure testing device, a methane gas was burned, and the combustion gas was blown onto the sample at velocities of flow shown in Table 2.

TABLE 3

| | | | | Composition | | | | | Production method | | |
|---|---|---|---|---|---|---|---|---|---|---|---|
| | | | | | Surface layer | | | | | Heat | |
| | | | | | | Stabilizer | | Impurit | Slurry | treatment | |
| Sample No. | Substrate Kind | Intermediate layer Kind | Kind | Kind | Kind | Kind | Amount mol % | Al mass % | Si mass % | viscosity (Pa·s) | Temp. (° C.) | Time (h) |
| 1 | $Si_3N_4$ | $Lu_2O_3$ | — | $Sm_2O_3$ | $ZrO_2$ | $Y_2O_3$ | 8 | <0.01 | <0.01 | 1 | 1500 | 1 |
| 2 | $Si_3N_4$ | $Yb_2O_3$ | — | $Sm_2O_3$ | $ZrO_2$ | $Y_2O_3$ | 8 | <0.01 | <0.01 | 1 | 1500 | 1 |
| 3 | $Si_3N_4$ | $Er_2O_3$ | — | $Sm_2O_3$ | $ZrO_2$ | $Y_2O_3$ | 8 | <0.01 | <0.01 | 1 | 1500 | 1 |
| 4 | $Si_3N_4$ | $Yb_2O_3$ | — | $La_2O_3$ | $ZrO_2$ | $Y_2O_3$ | 8 | <0.01 | <0.01 | 1 | 1500 | 1 |
| 5 | $Si_3N_4$ | $Yb_2O_3$ | — | $Sm_2O_3$ | $ZrO_2$ | $Y_2O_3$ | 8 | 0.1 | 0.1 | 1 | 1500 | 1 |
| 6 | $Si_3N_4$ | $Yb_2O_3$ | $Dy_2O_3$ | $Sm_2O_3$ | $ZrO_2$ | $Y_2O_3$ | 8 | <0.01 | <0.01 | 1 | 1500 | 1 |
| 7 | $Si_3N_4$ | $Yb_2O_3$ | — | $Sm_2O_3$ | $ZrO_2$ | $Lu_2O_3$ | 8 | <0.01 | <0.01 | 1 | 1500 | 1 |
| 8 | $Si_3N_4$ | $Yb_2O_3$ | — | $Sm_2O_3$ | $ZrO_2$ | $Yb_2O_3$ | 8 | <0.01 | <0.01 | 1 | 1500 | 2 |
| 9 | $Si_3N_4$ | $Yb_2O_3$ | — | $Sm_2O_3$ | $ZrO_2$ | $Er_2O_3$ | 8 | <0.01 | <0.01 | 1 | 1500 | 2 |
| 10 | $Si_3N_4$ | $Yb_2O_3$ | — | $Sm_2O_3$ | $ZrO_2$ | $Sm_2O_3$ | 8 | <0.01 | <0.01 | 2 | 1500 | 1 |
| 11 | $Si_3N_4$ | $Yb_2O_3$ | — | $Sm_2O_3$ | $ZrO_2$ | $Sc_2O_3$ | 8 | <0.01 | <0.01 | 0.6 | 1500 | 1 |
| 12 | $Si_3N_4$ | $Yb_2O_3$ | — | $Sm_2O_3$ | $ZrO_2$ | $Y_2O_3$ | 8 | <0.01 | <0.01 | 1 | 1500 | 1 |
| 13 | $Si_3N_4$ | $Yb_2O_3$ | — | $Sm_2O_3$ | $ZrO_2$ | $Y_2O_3$ | 3 | <0.01 | <0.01 | 1 | 1500 | 1 |
| 14 | $Si_3N_4$ | $Yb_2O_3$ | — | $Sm_2O_3$ | $ZrO_2$ | $Y_2O_3$ | 8 | <0.01 | <0.01 | 1 | 1500 | 1 |
| 15 | $Si_3N_4$ | $Yb_2O_3$ | — | $Sm_2O_3$ | $ZrO_2$ | $Y_2O_3$ | 12 | <0.01 | <0.01 | 1 | 1500 | 1 |
| *16 | $Si_3N_4$ | — | — | — | $Al_2O_3$ | — | — | — | — | 1 | 1500 | 1 |
| *17 | $Si_3N_4$ | — | — | — | MU | — | — | — | — | 1 | 1500 | 1 |
| *18 | $Si_3N_4$ | — | — | — | CJ | — | — | — | — | 1 | 1500 | 1 |
| *19 | $Si_3N_4$ | — | — | — | — | — | — | — | — | — | — | 1 |

Samples marked with * lie outside the scope of the invention.
MU: mullite
CJ: cordierite

TABLE 4

| | Surface layer | | | Intermediate | | Exposure test | | | | |
|---|---|---|---|---|---|---|---|---|---|---|
| Sample No. | Thickness (μm) | Porosity (%) | Crystal shape | layer Thickness (μm) | Heat shock test Peel | Temp. (° C.) | Flow velocity (m/s) | Vapor pressure (kPa) | Decrease of wt. (mg/cm²) | Cracks |
| 1 | 50 | 10 | equi-axed | 20 | no | 1200 | 150 | 30 | <1 | no |
| 2 | 50 | 10 | equi-axed | 20 | no | 1200 | 150 | 30 | <1 | no |
| 3 | 50 | 10 | equi-axed | 20 | no | 1200 | 150 | 30 | <1 | no |
| 4 | 50 | 10 | equi-axed | 20 | no | 1200 | 150 | 30 | <1 | no |
| 5 | 50 | 10 | equi-axed | 20 | no | 1200 | 150 | 30 | 2 | no |
| 6 | 50 | 10 | equi-axed | 20 | no | 1200 | 150 | 30 | <1 | no |
| 7 | 50 | 10 | equi-axed | 20 | no | 1200 | 150 | 30 | <1 | no |
| 8 | 50 | 10 | equi-axed | 20 | no | 1200 | 150 | 30 | <1 | no |
| 9 | 50 | 10 | equi-axed | 20 | no | 1200 | 150 | 30 | <1 | no |
| 10 | 50 | 10 | equi-axed | 20 | no | 1200 | 150 | 30 | <1 | no |
| 11 | 50 | 10 | equi-axed | 20 | no | 1200 | 150 | 30 | <1 | no |
| 12 | 200 | 5 | columnar | 20 | no | 1200 | 150 | 30 | <1 | no |
| 13 | 50 | 10 | equi-axed | 20 | no | 1200 | 150 | 30 | <1 | no |
| 14 | 50 | 10 | equi-axed | 20 | no | 1200 | 150 | 40 | <1 | no |
| 15 | 50 | 10 | equi-axed | 20 | no | 1200 | 150 | 30 | <1 | no |
| *16 | 50 | 10 | equi-axed | — | yes | 1200 | 150 | 40 | 200 | yes |
| *17 | 50 | 20 | equi-axed | — | yes | 1200 | 150 | 40 | 100 | no |
| *18 | 50 | 20 | equi-axed | — | yes | 1200 | 150 | 40 | 400 | no |
| *19 | — | — | — | — | — | 1200 | 150 | 40 | 500.0 | — |

Samples marked with * lie outside the scope of the invention.

It will be understood that with the samples Nos. 1 to 15, the coated layers were not peeled in the heat and shock testing, and losses of thickness through the exposure testing were not larger than 2 μm, and there were obtained excellent resistance against the heat and shock and excellent resistance against the corrosion.

The samples Nos. 16 to 18 without using stabilized $ZrO_2$ in the surface protection layer developed cracks in the heat and shock testing, and exhibited losses of thickness of not smaller than 100 μm.

What is claimed is:

1. Anti-corrosion ceramics comprising a substrate of at least one kind of silicon-containing ceramics selected from a silicon nitride, a silicon carbide and Sialon, and a surface protection layer formed on a surface of the substrate, wherein the surface protection layer comprises a zirconium oxide stabilized with an element of the Group IIIa of periodic table, and the total amount of Al and Si in the surface protection layer is suppressed to be not larger than 1% by mass, wherein an intermediate layer comprising a composite oxide represented by $RE_2Si_2O_7$ and/or $RE_2SiO_5$ (RE: element of the Group IIIa of periodic table) is provided between the substrate and the surface protection layer.

2. Anti-corrosion ceramics according to claim 1, wherein the content of the element of the Group IIIa of periodic table in the surface protection layer is from 3 to 15% by mol calculated as an oxide thereof.

3. Anti-corrosion ceramics according to claim 1, wherein the surface protection layer has a thickness of from 5 to 200 μm.

4. Anti-corrosion ceramics according to claim 1, wherein the element of the Group IIIa of periodic table used for stabilizing the zirconium oxide is at least one selected from Y, Er, Yb and Lu.

5. Anti-corrosion ceramics according to claim 1, wherein said intermediate layer is formed of disilicate crystals represented by $RE_2Si_2O_7$.

6. Anti-corrosion ceramics according to claim 5, wherein $RE_2Si_2O_7$ is $ER_2Si_2O_7$, $Yb_2Si_2O_7$ or $Lu_2Si_2O_7$.

7. Anti-corrosion ceramics according to claim 5, wherein said intermediate layers are formed in a plurality of numbers and are formed of disilicate crystals of different elements of the Group IIIa of periodic table, and the coefficients of thermal expansion of the substrate, of the plurality of intermediate layers, and of the surface protection layer are gradually increasing from the substrate toward the surface protection layer.

8. Anti-corrosion ceramics according to claim 7, wherein the intermediate layers have porosities of not larger than 5%.

9. Anti-corrosion ceramics according to claim 1, wherein said surface protection layer has a porosity of from 1 to 30%.

10. Anti-corrosion ceramics according to claim 1, wherein said surface protection layer comprises columnar crystals, the long axes of said columnar crystals being nearly perpendicular to the surface of the substrate.

* * * * *

UNITED STATES PATENT AND TRADEMARK OFFICE
CERTIFICATE OF CORRECTION

PATENT NO. : 6,682,821 B2
DATED : January 27, 2004
INVENTOR(S) : Fukudome et al.

It is certified that error appears in the above-identified patent and that said Letters Patent is hereby corrected as shown below:

<u>Title page,</u>
Item [75], Inventor, change "Sazo Tsurudono" to -- Sazo Tsuruzono --.

Signed and Sealed this

Twenty-second Day of November, 2005

JON W. DUDAS
*Director of the United States Patent and Trademark Office*